Figure 1:
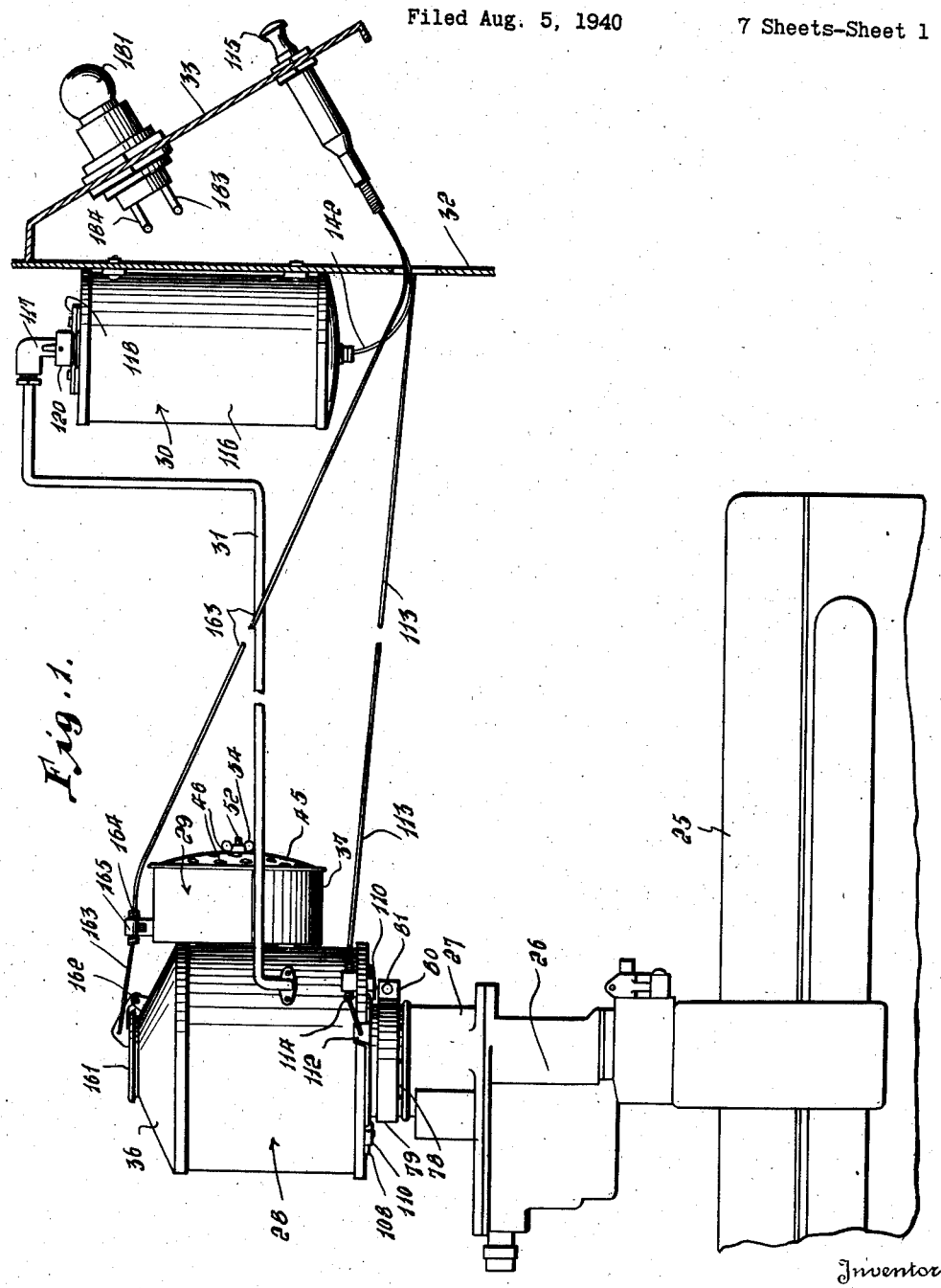

July 14, 1942.　　　　　　C. TRCA　　　　　　2,289,533
HEATER FOR STARTING COLD INTERNAL COMBUSTION ENGINES
Filed Aug. 5, 1940　　　　　7 Sheets-Sheet 1

Inventor
Charles Trca
By Bryant Lowry
Attorneys

July 14, 1942.  C. TRCA  2,289,533
HEATER FOR STARTING COLD INTERNAL COMBUSTION ENGINES
Filed Aug. 5, 1940  7 Sheets-Sheet 2

Inventor
Charles Trca
By
Bryant & Lowry
Attorneys

July 14, 1942.　　　　　C. TRCA　　　　　2,289,533
HEATER FOR STARTING COLD INTERNAL COMBUSTION ENGINES
Filed Aug. 5, 1940　　　　7 Sheets-Sheet 3
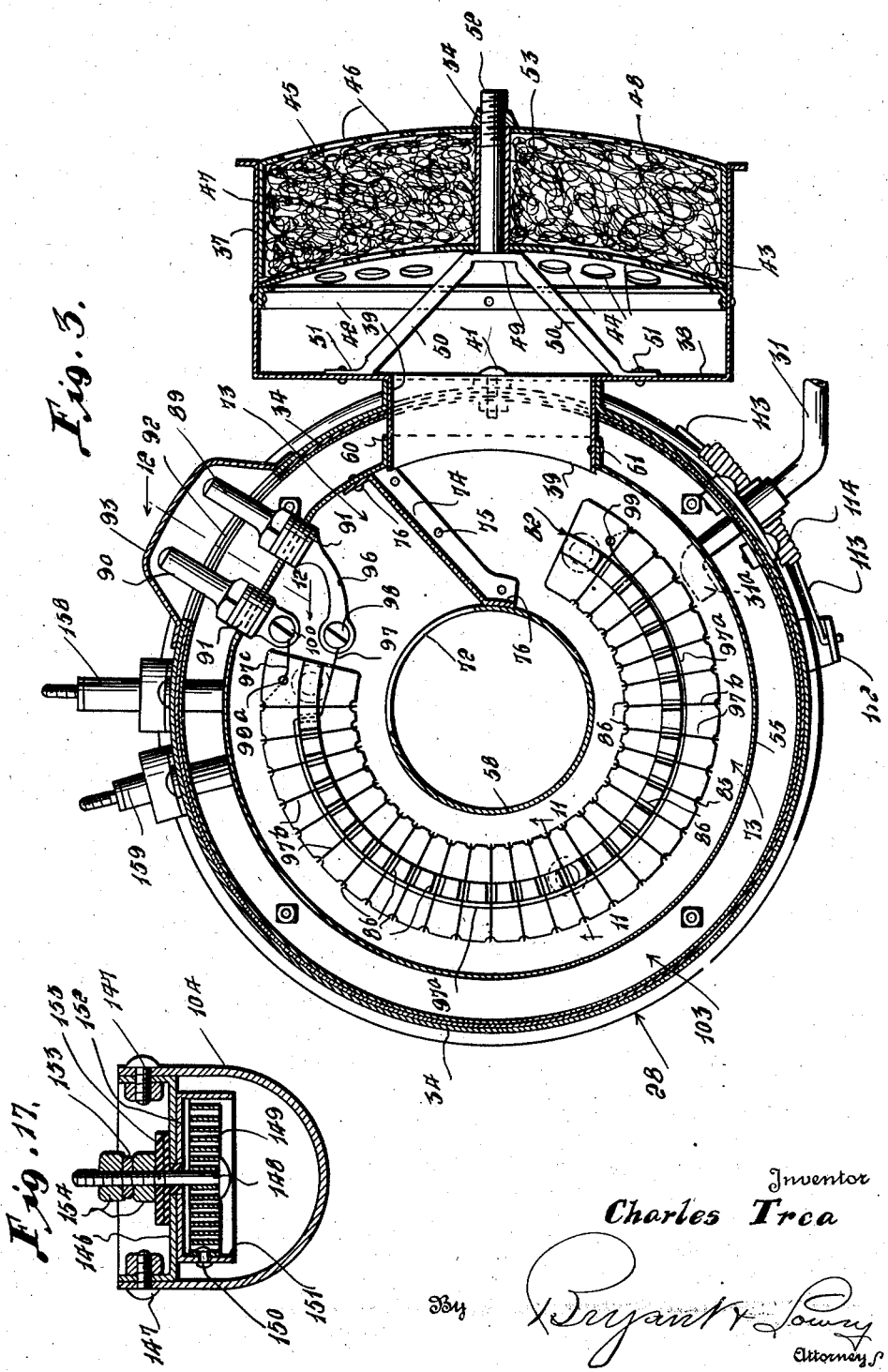
Inventor
Charles Trca
By Bryant & Lowry
Attorneys July 14, 1942.  C. TRCA  2,289,533
HEATER FOR STARTING COLD INTERNAL COMBUSTION ENGINES
Filed Aug. 5, 1940  7 Sheets-Sheet 4
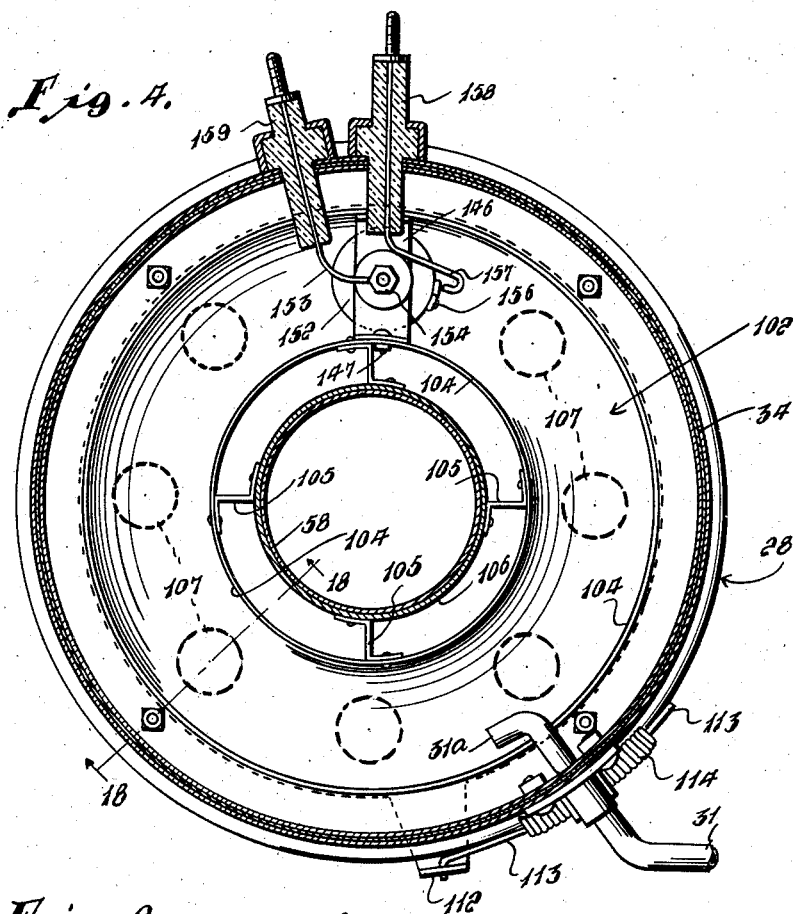
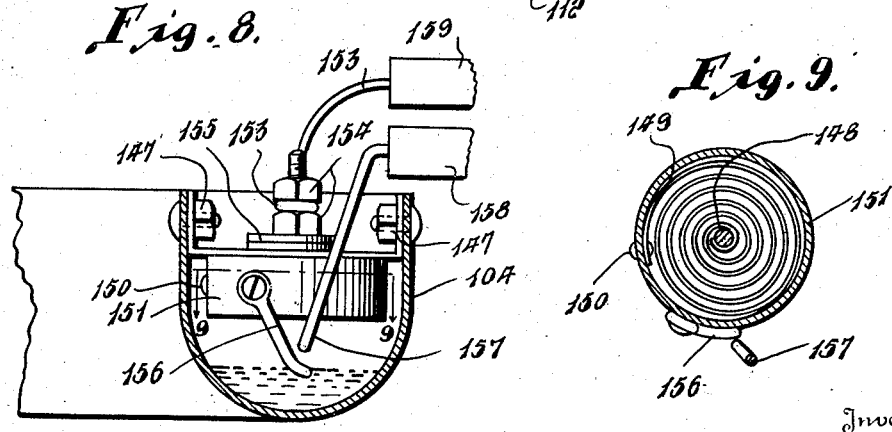
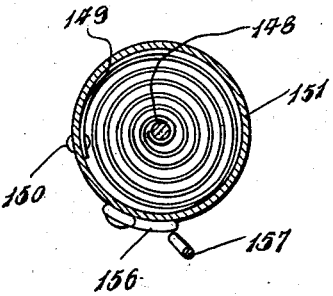
Inventor
Charles Trca
By Bryant & Lowry
Attorney July 14, 1942.  C. TRCA  2,289,533
HEATER FOR STARTING COLD INTERNAL COMBUSTION ENGINES
Filed Aug. 5, 1940   7 Sheets-Sheet 5
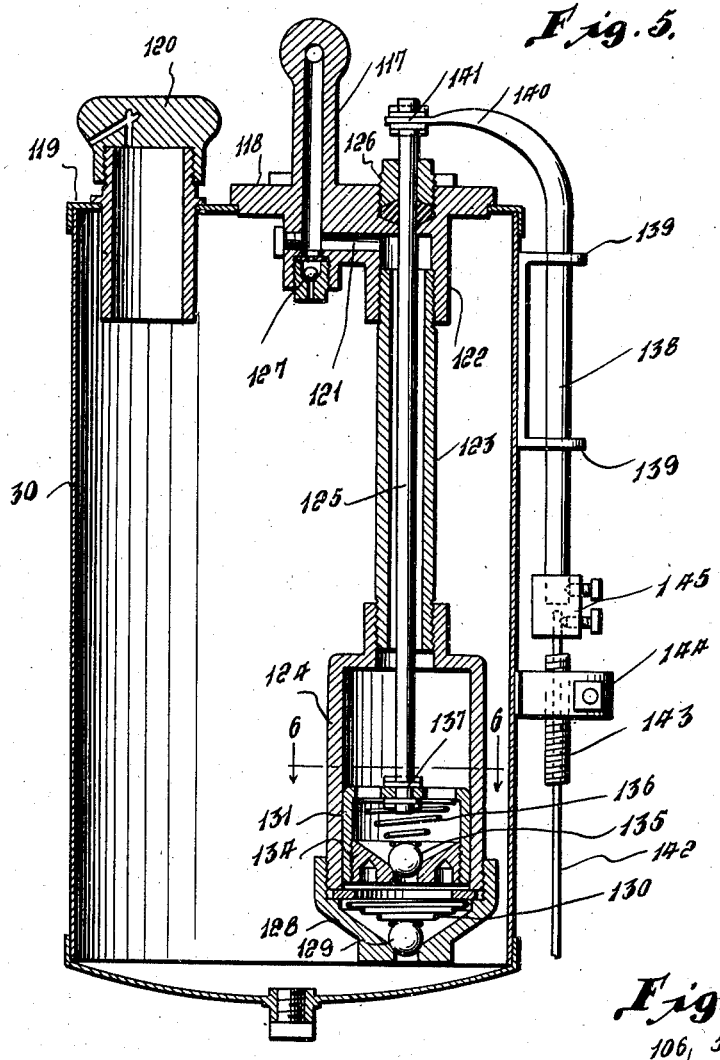
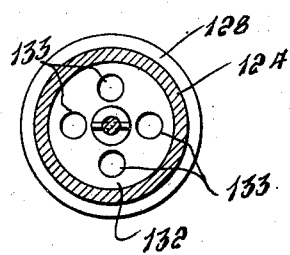
Inventor
Charles Trca
By Bryant K. Lowry
Attorneys July 14, 1942.  C. TRCA  2,289,533
HEATER FOR STARTING COLD INTERNAL COMBUSTION ENGINES
Filed Aug. 5, 1940  7 Sheets-Sheet 6
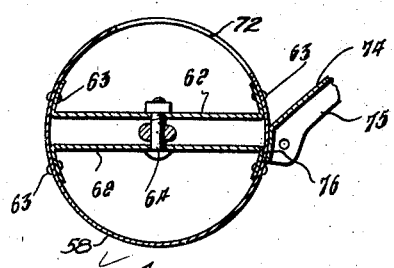
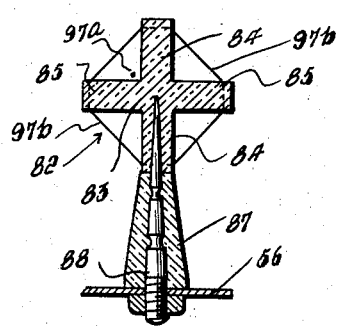
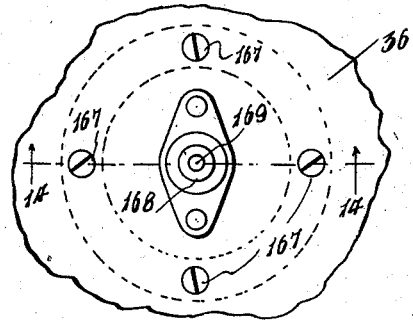
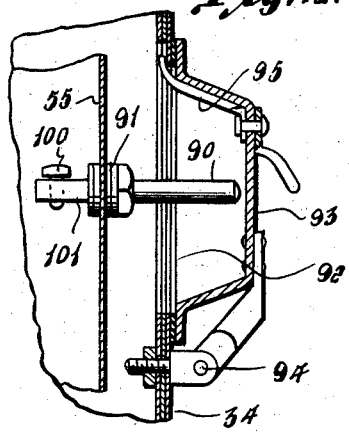
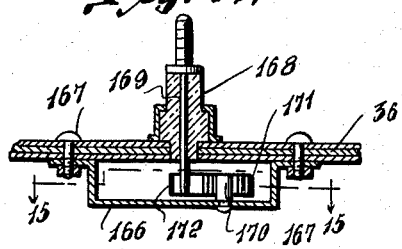
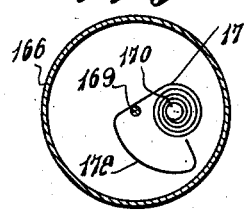
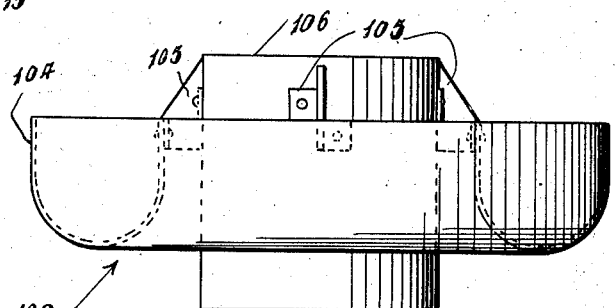
Inventor
Charles Trca
By Bryant & Lowry
Attorneys

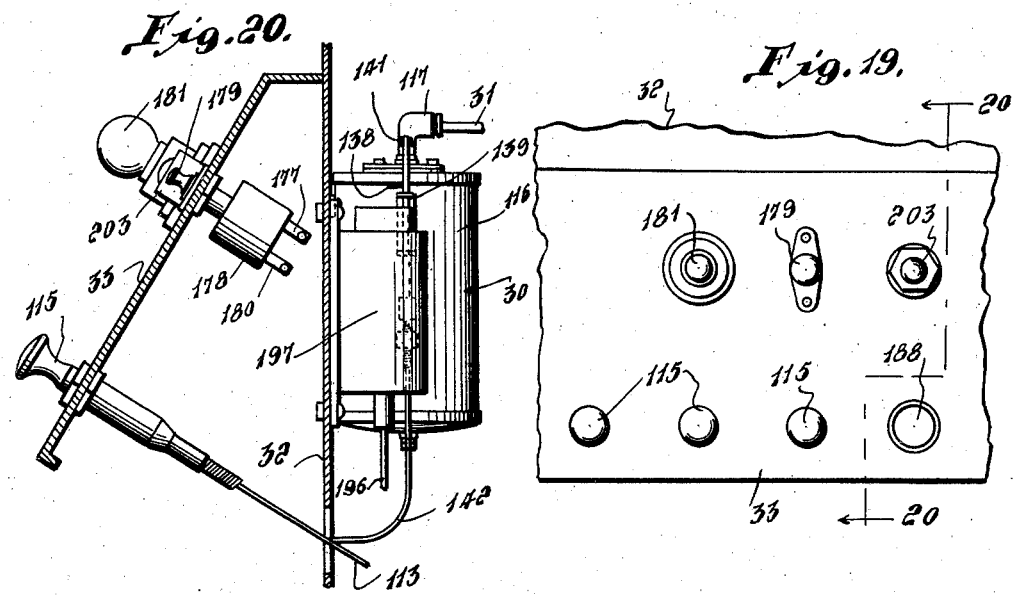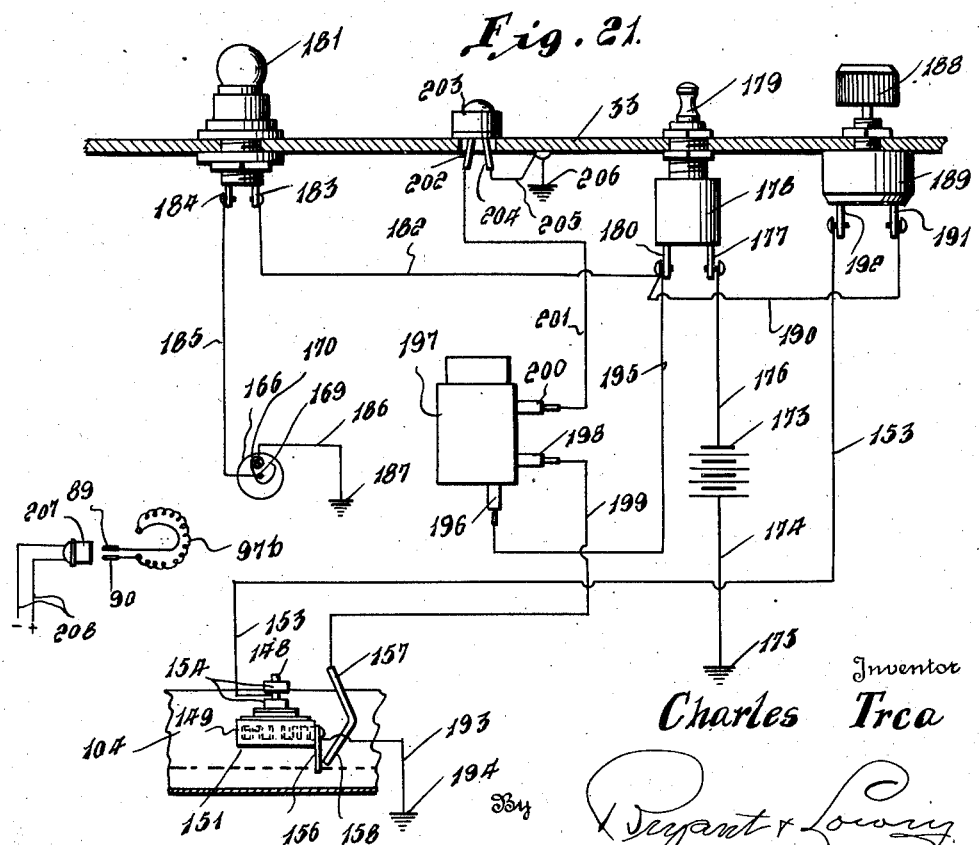

Patented July 14, 1942

2,289,533

UNITED STATES PATENT OFFICE 2,289,533

HEATER FOR STARTING COLD INTERNAL COMBUSTION ENGINES

Charles Trca, Pontiac, Mich.

Application August 5, 1940, Serial No. 351,457

10 Claims. (Cl. 126—93)

This invention relates to certain new and useful improvements in heaters for starting cold internal combustion engines, and is of the general type of invention disclosed in the patents granted to Charles Trca on February 2, 1937, Patent No. 2,069,689, and on March 5, 1940, Patent No. 2,192,389.

The primary object of the invention is to provide a heater for starting cold internal combustion engines wherein there is provided an air cleaner or filter through which air flows to the air intake pipe of a carburetor with means for heating the air interposed between the air filter or cleaner and the air intake pipe of the carburetor for heating the air to assure gasification of the fuel to aid in the starting of the internal combustion engine of a motor vehicle during cold weather.

A further object of the invention is to provide a heater for starting cold internal combustion engines wherein heating means is interposed in an air conduit between an air filter or cleaner and a carburetor, the air heating means including an alcohol burner or the like and an electric resistance element with the alcohol burner and the electric resistance element selectively usable at will for the heating of air during its flow to the intake pipe of a carburetor.

With the above and other objects in view that will become apparent as the nature of the invention is better understood, the same consists in general of certain novel details of construction and combination of parts hereinafter more fully described, illustrated in the accompanying drawings and claimed.

Figure 2:
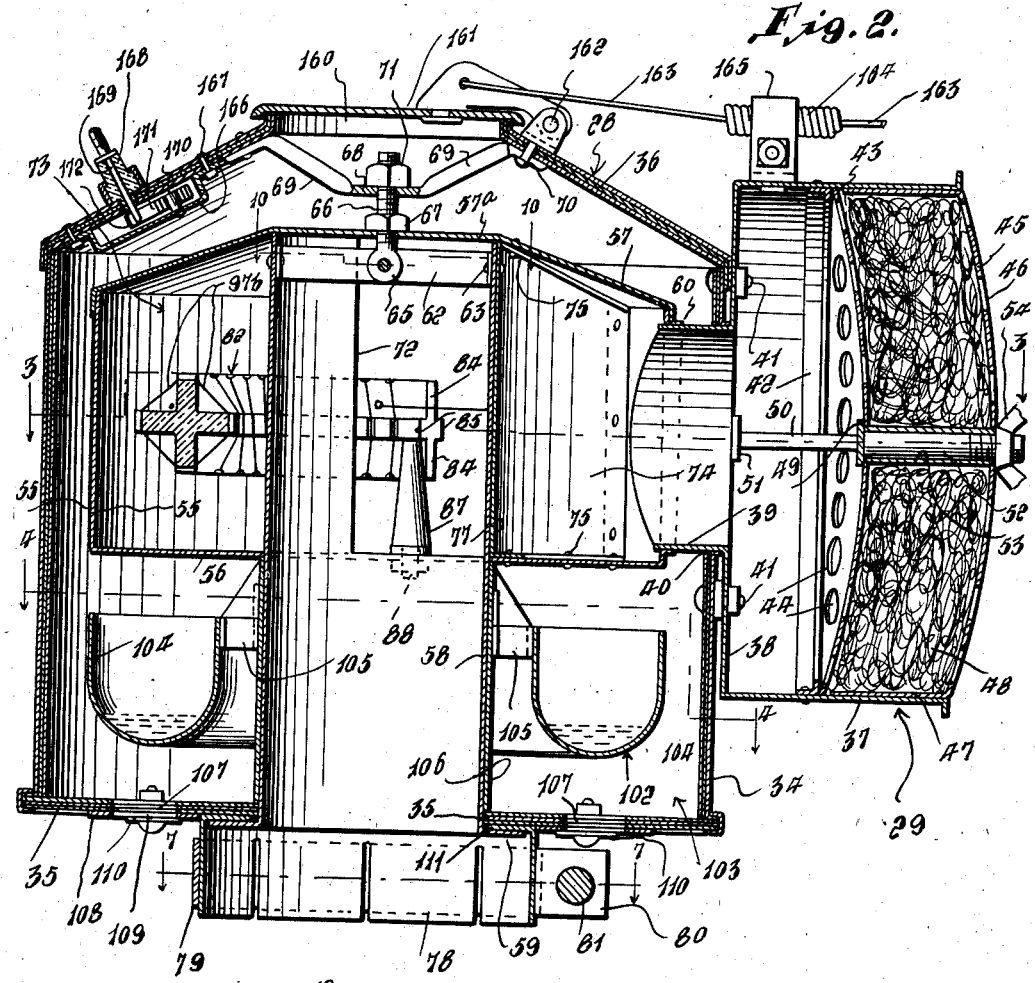
Figure 7:
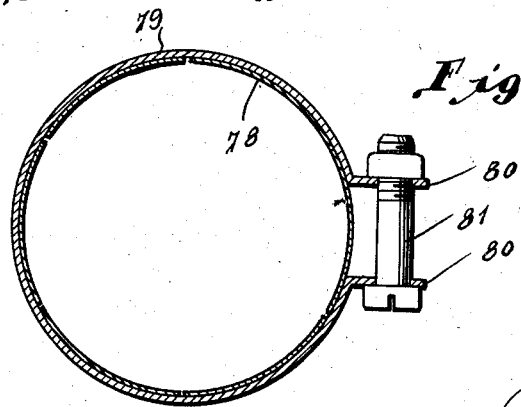

In the accompanying drawings:

Figure 1 is a fragmentary side elevational view of the apparatus including the heater for starting cold internal combustion engines, the instrument board and dash board of the motor vehicle being shown in section, Figure 2 is a vertical cross sectional view of the combined air filter or cleaner and air heater, showing the down draft pipe in the heater casing for the heated air, the lower alcohol burner for heating air and the upper electric resistance element for heating air, Figure 3 is a horizontal sectional view taken on line 3—3 of Figure 2, showing the baffle in the air heater casing for causing the air to travel in a circuitous path before flowing downwardly through the hot air pipe to the carburetor, Figure 4 is a horizontal sectional view taken on line 4—4 of Figure 2, showing an electric heating element in the alcohol trough for vaporizing the alcohol to facilitate ignition thereof, Figure 5 is a vertical sectional view of the alcohol supply tank and pump devices associated therewith that is mounted upon the dash board of the motor vehicle, Figure 6 is a horizontal detail sectional view taken on line 6—6 of Figure 5, Figure 7 is a horizontal sectional view taken on line 7—7 of Figure 2, showing the screw-operated clamp for attaching the combined air cleaner or filter and the heater to the air intake pipe of the carburetor, Figure 8 is a fragmentary detail vertical sectional view of the alcohol trough in the alcohol burner showing the electric devices for vaporizing the alcohol and the electric sparker for igniting the alcohol, Figure 9 is a detail horizontal sectional view taken on line 9—9 of Figure 8, Figure 10 is a detail horizontal sectional view taken on line 10—10 of Figure 2, Figure 11 is a detail cross-sectional view taken on line 11—11 of Figure 3, showing a porcelain post supporting the porcelain body or core upon which the resistance wire of the electric air heater is wound, Figure 12 is a detail cross sectional view taken on line 12—12 of Figure 3, showing the hinged closure door carried by the side wall of the heater controlling access to the electric terminals for the electric resistance heater, Figure 13 is a fragmentary top plan view of the air heater casing and a part of the heat signalling device, Figure 14 is a vertical longitudinal sectional view taken on line 14—14 of Figure 13, showing the thermostat element within the air heater casing controlling operation of the heat signalling device, Figure 15 is a horizontal sectional view taken on line 15—15 of Figure 14, Figure 16 is a side elevational view of the alcohol burner trough removed from the heater casing, Figure 17 is a detail cross-sectional view through the alcohol burner trough and the alcohol vaporizing device, Figure 18 is a detail cross-sectional view taken on line 18—18 of Figure 4, showing a damper construction for admitting air for combustion of the alcohol burner through the bottom wall of the air heater casing, Figure 19 is a fragmentary elevational view of the instrument board of the vehicle, showing the several control devices for the air heater, Figure 20 is a vertical cross-sectional view taken on line 20—20 of Figure 19, showing the alcohol supply tank supported upon the dash board of the motor vehicle, and Figure 21 diagrammatically illustrates the wiring arrangement of electrical devices associated with the heater, the instrument board being shown in section with control and signal devices supported thereon.

One method of mounting the heater in association with the carburetor for starting cold internal combustion engines is illustrated in Figure 1, the heater being illustrated as associated with a carburetor of a down-draft type, although it is to be understood that the heater may be associated with a carburetor in which the air is fed upwardly thereto. As shown in Figure 1, the reference character 25 designates an internal combustion engine having a carburetor 26 associated therewith, while a down draft air pipe 27 rises from the carburetor 26. A combined air cleaner or filter and air heater is connected to the upper end of the down draft pipe 27, the air heater being designated in general by the reference character 28, while the air cleaner or filter for delivering air to the heater 28 is designated in general by the reference character 29. The air heater 28 houses an alcohol burner for the heating of air and also electric resistance means for the heating of the air, these two heating features being selectively usable, the reference character 30 designating an alcohol tank having a pipe connection 31 with the alcohol burner within the air heater 28, the alcohol tank 30 being supported upon the dash board 32 while the instrument board 33 of the motor vehicle carries the control and signal devices for the operation of the air heater.

The air heater 28 is preferably in the form of a cylindrical casing having a cylindrical side wall 34, a flat bottom wall and a dome-shaped top wall 36, the wall construction of the casing preferably comprising inner and outer wall sections as shown in Figures 2 to 4 with an intermediate wall section of heat insulation material of any character, such as asbestos or the like. The top and bottom walls of the casing 28 preferably have a beaded connection with the upper and lower ends of the side wall to provide a tight connection between the wall sections.

The air filter or cleaner 29 is of generally circular formation and has an annular side wall 37 and a bottom wall 38 with a central opening in the bottom wall surrounded by an outwardly directed tubular flange 39 that extends into a side opening 40 in the cylindrical side wall of the air heater 28, the air cleaner or filter 29 being secured to the air heater 28 by bolt and nut combinations 41 passing through the bottom wall 38 of the air cleaner or filter and the side wall 34 of the air heater. A ring 42 of angle iron formation is anchored within the annular side wall 37 of the air cleaner or filter between the inner and outer ends thereof as shown in Figures 2 and 3 and forms an abutment for an arched disk plate 43 having relatively large openings 44 therein. The closure for the open outer end of the air filter or cleaner comprises an arched disk plate 45 having relatively large openings 46 therein, the disk plate 45 carrying an annular side wall 47 frictionally extending into and engaged with the inner face of the annular side wall 37. The air filter or cleaner per se comprises copper wool or the like designated by the reference character 48 as completely occupying the space between the arched disk plates 43 and 45 so that air entering the heater casing passes through the openings 46 of the end plate 45, the filter material 48 and openings 44 in the inner disk plate 43 to enter the air heater casing 28 by way of the tubular flange 39. To retain the disk plates 43 and 45 in assembled relation with respect to the annular side wall of the air cleaner or filter 29, there is provided as shown more clearly in Figures 2 and 3, an angle brace comprising a head 49 from which a pair of angularly disposed legs 50 project in V-formation, with the ends 51 of the legs anchored to the bottom wall 38 of the air cleaner or filter respectively at opposite sides of the tubular flange 39. A screw bolt 52 projects outwardly of the angle brace head 49 and extends through the apertured plates 43 and 45, the bolt 52 being surrounded by a spacer sleeve 53 for retaining the disk plates 43 in spaced relation while a removable nut 54 is threaded upon the outer end of the bolt 52 for retaining the parts in assembled relation.

An air heating chamber is formed in the air heater 28 in the upper zone of the latter and is of less diameter than the diameter of the cylindrical side wall 34 of the casing 28 and includes an annular side wall 55 having a bottom wall 56 with a central opening therein for purposes presently to appear, a dome-shaped top wall 57 being carried by the upper edge of the annular side wall 55 and having a central flat top wall portion 57ª as shown in Figure 2. A down-draft cylindrical air pipe 58 has the upper end thereof abuttingly engaging the flat top wall portion 57ª, the pipe 58 extending downwardly through the central opening in the bottom wall 56 and through a central opening in the bottom wall 35 of the heater casing 28 and is flanged outwardly as at 59 to engage the lower face of the bottom wall as shown. A cylindrical opening is formed in the annular side wall 55 and is surrounded by an outwardly extending annular flange 60 that telescopes upon the adjacent end of the tubular flange 39 carried by the bottom wall 38 of the air cleaner or filter 29, these overlapping flanges being riveted or otherwise secured together as at 61. The support for the air heating chamber and the cylindrical down-draft air pipe 58 is illustrated in Figures 2 and 10 as comprising a pair of spaced parallel straps 62 anchored at their ends as at 63 to the inner face of the upper end of the cylindrical down-draft air pipe 58 with a bolt 64 extending between the straps 62 intermediate the ends thereof. A screw eye-bolt has the eye 65 mounted upon the bolt 64 with the screw shank 66 thereof passing upwardly through the flattened top wall portion 57ª of the top wall 57 of the air heating chamber for the reception of a nut 67 that is operative for retaining the air heating chamber cover 57 and the cylindrical down-draft air pipe 58 in assembled relation. The screw shank 66 further extends upwardly through the head 68 of a V-shaped support that has legs 69 extending from the head with the ends thereof anchored as at 70 to the underside of the dome-shaped cover 36, a nut 71 being threaded upon the upper terminal end of the screw shank 66 and engaged with the head 68 so that the wall construction of the air heating chamber is supported by the top wall 36 of the air heater casing 28.

As shown more clearly in Figures 2 and 3, the side wall of the down-draft cylindrical air pipe 58 has a relatively large opening 72 therein that forms communication between the pipe 58 and the air heater chamber 73. A vertical baffle plate 74 extends between the top wall 57 and the bottom wall 56 of the air heater chamber, with the upper and lower ends thereof anchored in position to said walls as at 75, the outer vertical edge of the baffle plate 74 being flanged and anchored as at 76 to the inner face of the annular side wall 55 of the air heater chamber at one side of the flange 39 while the inner vertical edge of the baffle plate 74 is flanged and anchored as at 77 to the outer face of the cylindrical downdraft air pipe 58 at one side of the opening 72 in said pipe to cause air flowing into the air heating chamber 73 to flow through said chamber in a circular path before entering the opening 72 for a down flow through the pipe 58.

A multi-split annular sleeve 78 depends from the bottom wall of the air heater casing 29 in surrounding relation to the opening at the lower end of the down-draft air pipe 58 for mounting upon the upper end of the down-draft air pipe 27 of the carburetor 26 and is clampingly engaged therewith by means of the surrounding split ring 79 shown in Figures 2 and 3 by means of the outwardly directed spaced lugs 80 on the split ring 79 with which the bolt and nut combination 81 is associated.

An electric resistance heater element designated by the reference character 82 is arranged in the air heater chamber 73 and as shown more clearly in Figures 2, 3, 11 and 12, comprises an arcuate insulation body 83 of cruciform design in cross-section having upper and lower ribs 84 and horizontal ribs 85, the outer ends of the ribs 84 and 85 having spaced notches 86 therein. The spaced ends of the arcuate resistance body 83 terminate respectively at opposite sides of the baffle plate 74 and the support for the arcuate insulation body 83 includes a series of spaced insulation posts 87 rising from the bottom wall 56 of the air heater chamber with anchor pins 88 extending upwardly through the bottom wall 56 of the air heater chamber, the insulation posts 87 and the lower rib 84 as shown in Figure 11. A pair of electric terminals 89 and 90 is supported through the medium of insulation devices 91 in the side wall 55 of the air heater chamber, the terminals 89 and 90 extending outwardly of the cylindrical side wall 34 of the air heater 28 through the side wall opening 92 and are covered by the outwardly arched door 93 shown more clearly in Figures 3 and 12 as being hingedly mounted at one side thereof as at 94 with the free side thereof retained in its closed position by the manually operated latch arm 95. A terminal arm 96 projects into the air heater chamber 23 from the terminal 89 and has one end of a resistance wire 97 anchored thereto as at 98, the wire passing through an opening at the base of the upstanding rib 84 from the inner side of said rib to the outer side thereof and being trailed around the outer side of said rib as at 97ª to the other end of said rib where the same passes downwardly through an opening 99 in the adjacent horizontal end of the outwardly directed horizontal rib 85 and thereafter spirally wound as at 97ᵇ around the ribs 84 and 85 and being fitted in the grooves 86 at the outer ends of said ribs, the other terminal end 97ᶜ of the end of the spirally wound section 97ᵇ passes through an opening 99ª in the outer horizontal rib 85 and is anchored as at 100 to the terminal arm 101 extending into the air heater chamber 73 from the electric terminal 90. It is primarily intended that the electric resistance element be placed in communication with a source of electrical energy supplied to a house or garage by opening the door 93 and engaging a socket member with the terminals 89 and 90. It will be understood from an inspection of Figures 2 and 3 that with the electric resistance element 82 in operation air drawn in through the air cleaner or filter 29 will be directed by the baffle plate 74 to travel in a horizontal arcuate path in the air heater chamber 73 over the electric resistance element 82 for contact with the opposite side of the baffle 74 and for subsequent discharge into the opening 72 in the cylindrical down-draft air pipe 58 for delivery to the down-draft pipe 27 of the carburetor 26.

An alcohol burner designated in general by the reference character 102 is located in the chamber 103 of the heater casing 28 below the bottom wall 56 of the upper air heater chamber 73 and is usable at will and when the use of electricity is not available. As shown more clearly in Figures 2 and 16, the alcohol burner 102 comprises an annular trough 104 of U-shape in cross-section that has angle bracket connections 105 with a tubular support 106 that is slidably mounted upon the lower end of the down-draft air pipe 58 to engage at its upper end the bottom wall 56 of the air heater chamber and the bottom wall 35 of the air heater casing 28. The trough 104 occupies a position substantially midway the upper and lower ends of the chamber 103 as shown in Figure 2. To facilitate the introduction of air into the chamber 103 to aid combustion in the operation of the alcohol burner, the bottom wall 35 of the air heater casing 28 as shown in Figures 2, 4 and 18 is provided with a circular series of spaced air inlet openings 107 with which a damper plate 108 is rotatably associated, the damper plate 108 having a circular series of spaced openings 109 adapted to register with the bottom wall openings 107, the damper plate 108 being supported and guided in its movements by the flanged supports 110 and 111 carried by the bottom wall 35 of the air heater casing 28. To operate the damper plate 108, there is provided an outwardly directed flanged arm 112 to the outer end of which a wire rod 113 is attached, the wire rod 113 extending through a coil guide 114 as shown in Figures 1 and 4 and leading to the instrument board 33 of the motor vehicle for operation by one of the push or pull buttons 115.

To supply alcohol to the trough 104 of the alcohol burner 102, there is provided the alcohol tank 30 that has the pipe connection 31 as shown in Figure 1 with the heater casing 28 by having the end 31ª of the pipe 31 extend through the cylindrical side wall 34 of the heater casing to enter the chamber 103 and discharge into the trough 104. The connection of the pipe 31 with the alcohol tank 30, as shown in Figures 1 and 5, includes an elbow fitting 117 rising from a block 118 set into an opening in the top wall 119 of the tank 30. A filler opening is provided in the top wall 119 of the tank 30 and is closed by a vented stopper 120. Pump mechanism and operating means therefor are associated with the tank 30 for forcing the alcohol in the tank through the pipe connection 31 to the burner trough 104, and as shown in Figure 5, the block 118 within the tank 30 has a cross bore 121 therein, one end of the cross bore communicating with the internally threaded boss 122 depending from the block 118. A tubular member 123 has a threaded connection at its upper end with the boss 122 and a threaded connection at its lower end with the tubular boss rising from the upper end of a pump cylinder 124, a piston rod 125 being reciprocable in the pump cylinder 124, extending upwardly through the tubular member 123 and through an opening in the block 118 above the boss 122 to project above the block 118 and outwardly of the tank 30 with a packing gland 126 cooperating with the upper end of the piston rod 125 and block 118. The other end of the cross bore 121 in the block 118 communicates with the elbow fitting 117 while the lower end of the block 118 in line with the lower end of the elbow fitting 117 is provided with an upwardly opening check valve 127. A piston is associated with the lower end of the piston rod 125 and is reciprocably mounted in the cylinder 124, the lower end of the cylinder as shown in Figure 5 having a centrally apertured cap 128 mounted thereon with a check valve 129 spring-pressed as at 130 closing the aperture in the cap 128. The piston comprises a cylindrical side wall 131 having a top wall 132 with spaced apertures 133 therein, the bottom wall of the piston 131 comprising a disk 134 threaded therein and having a conical upper face with a central opening closed by a ball valve 135 normally closing the opening through the disk 134 by means of the coil spring 136 interposed between the ball valve and the top wall 132 of the piston. The lower end of the piston rod 125 is attached as at 137 to the top wall 132 of the piston. To operate the piston 131, there is provided a rod 138 reciprocably mounted in guide bracket arms 139 exteriorly of the tank 30 with the rod 138 being movable longitudinally of the tank, the upper end of the rod 138 having a curved end 140 that is attached as at 141 to the upper end of the piston rod 125. An operating wire or cable 142 extends from the instrument board 33 for operation by one of the push and pull buttons 115, the other end of the wire or cable 142 extending through a coiled guide 143 carried by a bracket support 144 on the tank 30 with the terminal end of the wire and cable 142 attached to the lower end of the rod 138 by means of a coupling.

It will be understood that when the rod 138 is reciprocated by means of the wire or cable 142, corresponding movements are imparted to the piston rod 125 and piston in the cylinder 124, upward movement of the piston closing the valve 135 on its seat and opening the valve 129 at the lower end of the cylinder cap 128 to draw alcohol into the lower end of the pump cylinder 124 from the tank 30. During lower movement of the piston 131 the valve 129 closes on its seat while the valve 135 moves from its seat to permit the flow of alcohol upwardly into the cylinder 124 and tubular member 123. By several reciprocatory movements of the piston 131, alcohol is pumped upwardly through the tubular member 123 and into the cross bore 121 and the block 118 and through the elbow fitting 117 to the pipe connection 31 from the alcohol tank 30 to the trough 104 of the alcohol burner 102.

An appropriate level of alcohol in the trough 104 is effected by the operation of the pump and, as shown in Figures 3, 4, 8, 9 and 17, there is illustrated means for effecting vaporization and ignition of the alcohol which includes a resistance element and a sparking device mounted in the trough 104. As shown in Figures 4, 8 and 17, a strap 146 extends across the trough 104 and has angle ends anchored as at 147 to the upper edges of the side wall of the trough, the strap having an electric terminal post 148 extending downwardly and centrally therethrough, insulated therefrom as shown in Figure 17, with the lower headed end of the post 148 having the inner convolution of a resistance coil 149 anchored thereto, the outer convolution of said coil 149 being anchored as at 150 to the side wall 151 of an inverted cup-shaped member 152 that is flatly engaged with the bottom face of the strap 146. The terminal post 148 extending above the strap 146 has an electric conductor 153 attached thereto by means of clamping nuts 154 with insulation washers 155 interposed between the nuts 154 and the strap 146. As shown in Figure 8, a ground terminal arm 156 is carried by the side wall 151 of the cup-shaped member 152 and dips into the alcohol within the trough 104. An igniter terminal 157 extends into the trough 104 adjacent the ground terminal arm 156 and is carried by a porcelain plug 158 mounted in the cylindrical side wall 34 of the air heater 28. A porcelain plug 159 carries the conductor wire 153. The flame from the alcohol burner 102 heats the walls of the air heater chamber 73 so that air drawn through the chamber 73 becomes heated before escaping through the opening 72 in the downdraft pipe 58 and to aid in combustion of the alcohol burner air enters the chamber 103 by way of the damper openings 107 in the bottom wall 35 of the air heater casing 28. For venting the chamber 103, as shown in Figure 2, the dome-shaped cover 36 of the air heater 28 has a central opening 160 closed by the cover 161 hinged in position as at 162 and operated by the wire or rod 163 passing through a coil guide 164 supported in a bracket 165 carried by the side wall 37 of the air filter or cleaner 29, the wire or rod 163 extending to the instrument board 33 of the motor vehicle and being operated by one of the push or pull buttons 115.

Means is provided to indicate the temperature of the air flowing through the air heater chamber 73 and as shown in Figures 2 and 13 to 15, the cover 36 of the air heater 28 has a heat responsive device mounted upon the underside thereof within the upper end of the chamber 103, said device comprising a cup-shaped casing 166 having a marginal flange that is secured as at 167 to the cover wall 36, a porcelain plug 168 set into the cover 36 centrally of the casing 166 carrying a terminal post 169 that extends into the casing 166. A pin 170 carried off center of the bottom wall of the casing extends upwardly therein and has the inner convolution of a coiled expansible band 171 anchored thereto, the free end 172 of the coiled band being normally spaced from the casing 166.

The electrical devices for effecting operation of the apparatus are diagrammatically illustrated in Figure 21. The storage battery 173 has a conductor wire 174 from one terminal thereof as at 175. The conductor wire 176 from the other terminal of the battery 173 extends to the terminal 177 of the main control switch 178 operated by the switch button 179 on the instrument board 33. The control switch 178 has a second terminal 180. A signal lamp 181 mounted upon the instrument board 33 is associated with the heat responsive element shown in Figures 13 to 15 and adapted to be illuminated when the temperature of the air in the air heating chamber 73 has been raised to the desired degree and to accomplish the illumination of the signal lamp 181, a conductor wire 182 extends from the main switch terminal 180 to the terminal 183 of the socket for the lamp 181, the other terminal 184 of said socket having the conductor wire 185 extending therefrom to the terminal post 169 of the heat responsive device 166. The pin 170 carrying the coiled expansible band 171 has a conductor wire 186 extending therefrom to the ground 187. When the temperature of the chamber 103 rises to a predetermined degree, the coiled expansible band contacts the casing member 166 to complete the circuit for the illumination of the signal lamp 181. When it is desired to vaporize the alcohol in the trough 104 to facilitate ignition thereof by the igniter terminal 157 as shown in Figures 8, 9 and 17, the button 188 of the switch device 189 mounted upon the instrument board is operated to cause the circuit from the battery 173 to flow over the wire 190 connected at one end to the terminal 180 of the control switch 178, the other end of the wire 190 being connected to the terminal 191 of the switch device 189, while the other terminal 192 of the switch device 189 has the conductor wire 153 extending to the terminal post 148 of the vibrator, the cup-shaped member 152 having a ground wire 193 extending to the ground 194, the terminal arm 156 dipping into the alcohol in the trough 104 being operative to vaporize the alcohol. For the ignition of the alcohol, the wire 195 extending from the terminal 180 of the main control switch 178 is connected to the terminal 196 of the coil 197 that is supported upon the dash board 32 as shown in Figure 20, the second terminal 198 of the coil 197 having a conductor wire 199 thereof extending to the igniter terminal 157. A third terminal 200 of the coil 197 has a conductor wire 201 extending to the terminal 202 of the push button switch 203 mounted upon the instrument board 33, the other terminal 204 of the push button switch having a conductor wire 205 extending to the ground 206. The wiring arrangement for the use of the electric heater element 82 is also shown in Figure 21, the electric terminals 89 and 90 adapted to have a contact plug 207 of house wiring arrangement 208 engaged therewith.

From the above detailed description of the invention, it is believed that the construction and use thereof will at once be apparent, it being understood that the electric heater element 82 and the alcohol burner 102 are selectively usable for the heating of air drawn into the air heater 28 through the air cleaner or filter 29, the air traveling in an arcuate path through the air heater chamber 73 and escaping therefrom through the opening 72 in the cylindrical down-draft air pipe 58 to enter the down-draft pipe 27 of the carburetor 26, the air to be heated by direct flowing contact with the electric heater element 82 when the latter is in use, or to absorb heat from the walls surrounding the air heating chamber 73 when the alcohol burner 102 is in use.

While there is herein shown and described the preferred embodiment of the invention, it is to be understood that minor changes may be made in the details of construction, such as will fall within the scope of the invention as claimed.

I claim:

1. In an air heater of the character described, an air heater casing having an air inlet opening at one side thereof, spaced concentric wall structures within the air heater casing providing an inner air flow chamber and a combustion chamber surrounding the air flow chamber, an alcohol burner in the combustion chamber, a downflow air pipe disposed centrally of the air flow chamber and outletting at the bottom of the air heater casing, the pipe having an opening therein within the air flow chamber, and a baffle in the air flow chamber for directing the air inletting through the side opening in an arcuate path to the pipe opening.

2. In an air heater of the character described, an air heater casing having an air inlet opening at one side thereof, spaced concentric wall structures within the air heater casing providing an inner air flow chamber and a combustion chamber surrounding the air flow chamber, an alcohol burner in the combustion chamber, a downflow air pipe disposed centrally of the air flow chamber and outletting at the bottom of the air heater casing, the pipe having an opening therein within the air flow chamber, a baffle in the air flow chamber for directing the air inletting through the side opening in an arcuate path to the pipe opening, the alcohol burner including a circular trough surrounding the down-flow air pipe, means for supplying alcohol to the trough, means for vaporizing the alcohol and means for igniting the alcohol.

3. In an air heater of the character described, an air heater casing having an air inlet opening at one side thereof, spaced concentric wall structures within the air heater casing providing an inner air flow chamber and a combustion chamber surrounding the air flow chamber, an alcohol burner in the combustion chamber, a downflow air pipe disposed centrally of the air flow chamber and outletting at the bottom of the air heater casing, the pipe having an opening therein within the air flow chamber, a baffle in the air flow chamber for directing the air inletting from the air inlet opening in an arcuate path to the pipe opening, the alcohol burner including a circular trough surrounding the down-flow air pipe, means for supplying alcohol to the trough, means for vaporizing the alcohol and means for igniting the alcohol, the alcohol supply means including an alcohol tank and conduit communication with the trough, and a manually operated pump in the tank for forcing alcohol through the conduit to the trough.

4. In an air heater of the character described, an air heater casing having an air inlet opening at one side thereof, spaced concentric wall structures within the air heater casing providing an inner air flow chamber and a combustion chamber surrounding the air flow chamber, an alcohol burner in the combustion chamber, a downflow air pipe disposed centrally of the air flow chamber and outletting at the bottom of the air heater casing, the pipe having an opening therein within the air flow chamber, a baffle in the air flow chamber for directing the air inletting from the air inlet opening in an arcuate path to the pipe opening, the alcohol burner including a circular trough surrounding the down-flow air pipe, means for supplying alcohol to the trough, means for vaporizing the alcohol and means for igniting the alcohol, the alcohol vaporizing means including an electric heat-resistance element in the trough having a ground terminal arm adapted to dip into alcohol in the trough.

5. In an air heater of the character described, an air heater casing having an air inlet opening at one side thereof, spaced concentric wall structures within the air heater casing providing an inner air flow chamber and a combustion chamber surrounding the air flow chamber, an alcohol burner in the combustion chamber, a down-flow air pipe disposed centrally of the air flow chamber and outletting at the bottom of the air heater casing, the pipe having an opening therein within the air flow chamber, a baffle in the air flow chamber for directing the air inletting from the air inlet opening in an arcuate path to the pipe opening, the alcohol burner including a circular trough surrounding the down-flow air pipe, means for supplying alcohol to the trough, means for vaporizing the alcohol and means for igniting the alcohol, the alcohol vaporizing means including an electric heat-resistance element in the trough having a ground terminal arm adapted to dip into alcohol in the trough, and an alcohol igniter terminal in the trough cooperating with the ground terminal arm.

6. In an air heater of the character described, an air heater casing having an air inlet opening at one side thereof, spaced concentric wall structures within the air heater casing providing an inner air flow chamber and a combustion chamber surrounding the air flow chamber, an alcohol burner in the combustion chamber, and a manually operated hinged venting closure cover for the upper end of the combustion chamber above the air flow chamber.

7. In an air heater of the character described, an air heater casing having an air inlet opening at one side thereof, spaced concentric wall structures within the casing providing an inner circular air flow chamber and a combustion chamber surrounding the air flow chamber and extending above and below the latter, an air pipe arranged axially of the two chambers, said pipe having a side opening therein forming communication between the pipe and the air flow chamber, an alcohol burner in the combustion chamber below the air flow chamber supported on and surrounding said air pipe and said air heater casing having a damper controlled air inlet for the admission of air to the combustion chamber for combustion for said alcohol burner.

8. In an air heater of the character described, an air heater casing having an air inlet opening at one side thereof, spaced concentric wall structures within the casing providing an inner circular air flow chamber and a combustion chamber surrounding the air flow chamber and extending above and below the latter, an air pipe arranged axially of the two chambers, said pipe having a side opening therein forming communication between the pipe and the air flow chamber, an alcohol burner in the combustion chamber below the air flow chamber supported on and surrounding said air pipe, and means in said air flow chamber to cause air to travel completely therearound before entering the opening in the pipe.

9. In an air heater of the character described, an air heater casing having an air inlet opening at one side thereof, concentric wall structures within the casing providing an inner circular air flow chamber and a combustion chamber surrounding the air flow chamber and extending above and below the latter, a down-flow air pipe arranged axially of the two chambers, said pipe having a side opening therein forming communication between the pipe and the air flow chamber, an alcohol burner in the combustion chamber below the air flow chamber supported on and surrounding said down-flow air pipe, means for effecting vaporization of the alcohol in the burner and means for igniting the alcohol.

10. In an air heater of the character described, an air heater casing having an air inlet opening at one side thereof, concentric wall structures within the casing providing an inner circular air flow chamber and a combustion chamber surrounding the air flow chamber and extending above and below the latter, a down-flow air pipe arranged axially of the two chambers, said pipe having a side opening therein forming communication between the pipe and the air flow chamber, an alcohol burner in the combustion chamber below the air flow chamber supported on and surrounding said down-flow air pipe, said casing having a shutter controlled air inlet opening in the bottom wall thereof and a cap-closed vent opening in the top wall of the casing.

CHARLES TRCA.